United States Patent Office 3,128,867
Patented Apr. 14, 1964

3,128,867
CONVEYOR SYSTEMS
Ralph E. Karcher, Jr., Magnolia, and Alfred G. Cicchetti, Beverly, Mass., assignors to United Shoe Machinery Corporation, Flemington, N.J., a corporation of New Jersey
Filed Apr. 5, 1962, Ser. No. 185,273
8 Claims. (Cl. 198—19)

This invention relates generally to belt conveyor systems of the type in which articles are dispatched from a storage station to various work stations, and returned to the storage station after a predetermined operation has been performed on the article, and has particular reference to a control system adapted for use therewith.

In certain types of manufacturing operations where a number of operations are to be performed on an article at different work stations by different operators, it has been found desirable to return the article to a central storage and dispatch station after the operation at each work station, rather than send it directly to another work station for a subsequent operation. Such a procedure is particularly desirable in situations where it is desired that the working procedure or order of operations be frequently varied, or where quality control requires frequent inspections of the work in process.

For this purpose it has been proposed to utilize a belt conveyor under the control of a dispatcher at a storage and control station at the head of the belt, the upper run of the belt being utilized to carry articles (which term is meant to include boxes of work) to a position opposite work stations disposed along the belt, the lower run of the belt being utilized to return the articles to the storage station.

Many methods have been proposed for controlling the operation of this type of conveyor to insure that an article is dispatched to the desired work station. Some systems contemplate the use of a continuously moving belt, with automatic means for diverting, pushing, pivoting, or tilting the article off the conveyor at the proper work station; however, such systems require complex and expensive article removing mechanism at each work station. It has therefore been considered desirable to provide a system in which the belt stops automatically when the article has reached the desired work station, to permit the box to be removed manually by an operator at the work station. A number of methods have been proposed for use with such systems to detect the arrival of the article at the work station, such as magnetic, optical, or electromechanical means. However, all such means are too expensive to be incorporated into a commercial apparatus for use in manufacturing operations having a low profit margin.

It has been proposed that for economy of construction, control means should be incorporated into the dispatcher's control panel which would permit the dispatcher electrically to pre-set the distance to be traveled by the conveyor, which would, in effect, determine the work station to which the article is to be delivered. Although such systems have been used commercially to some extent, they have been subject to a number of disadvantages such as complex and expensive circuitry, involving many sequential relays, a tendency for the belt to get out of register with the station selector, with no convenient means for bringing it back into register. Such systems have been subject to delays in operation due to an improper work procedure by an operator or a dispatcher, which sometimes renders the conveyor inoperative. These disadvantages have limited the use of such systems, particularly in low profit margin operations, where an efficient work handling system is most needed.

The object of this invention is to provide a belt conveyor system of the type described having means under the control of the dispatcher for sending a supply of work to any one of several work stations that have signalled for work.

A further object of the invention is to provide a belt conveyor system of the type described in which means is provided for preventing the accidental dispatch of work to a work station that has not signalled for work.

A further object of the invention is to provide a control system for a belt conveyor of the type described in which means is provided to enable the dispatcher to correct an error in procedure by either an operator at a work station or by a dispatcher.

A further object of the invention is to provide a control system for a belt conveyor of the type described in which means is provided to enable the dispatcher to bring the belt into proper register with the control mechanism.

A further object of the invention is to provide a control means for a belt conveyor of the type described which has greatly improved reliability over previously known control systems used for this purpose.

Other objects of the invention will be apparent to one skilled in the art from the following description of a specific embodiment thereof.

Figure 1:
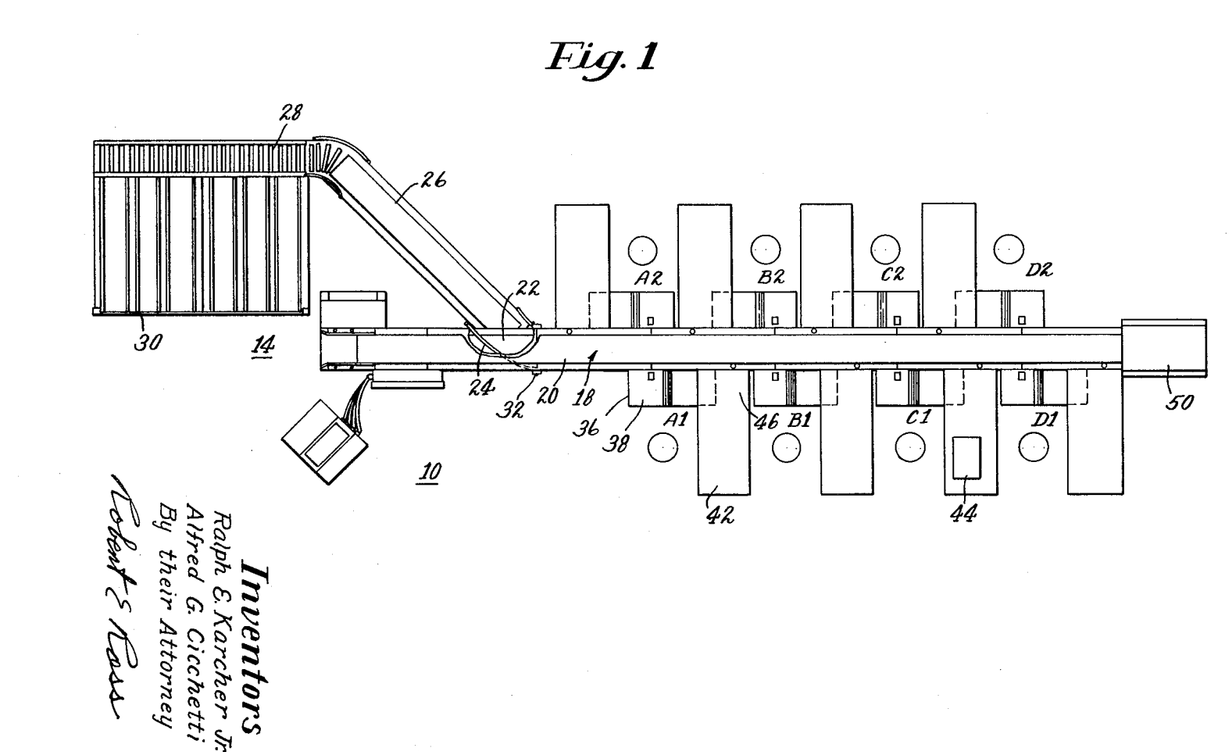
FIG. 1 is a top plan view of a conveyor system embodying the features of the invention.
Figure 2:
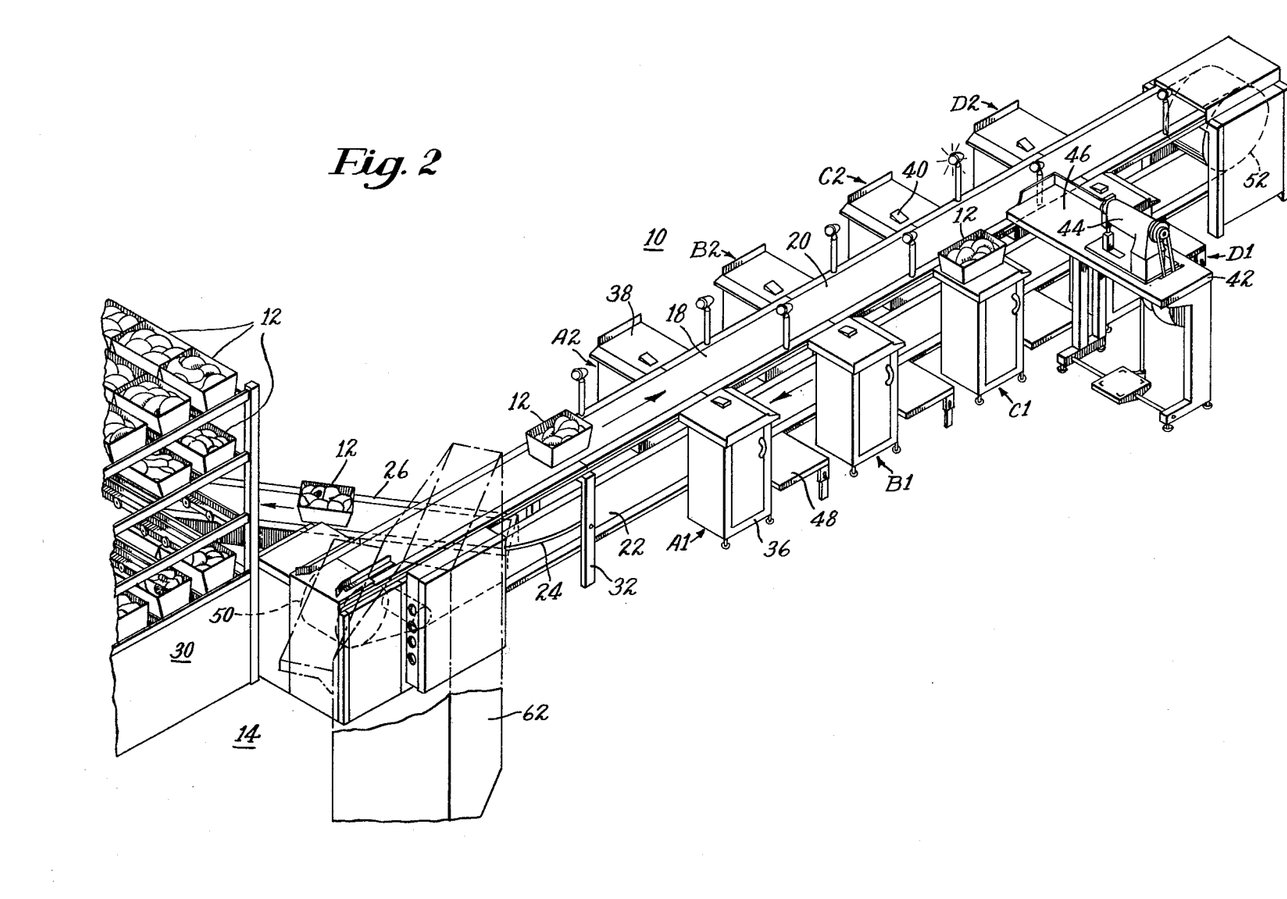
FIG. 2 is a perspective view of the conveyor system of FIG. 1.

Referring to the drawings, there is illustrated a belt conveyor system 10, which is adapted to transfer articles, such as boxes 12 containing work in process, from a storage and dispatch station 14 to work stations A1, A2, B1, B2, etc. disposed in pairs on opposite sides of the belt. In the illustrated embodiment the conveyor comprises a belt 18, having an upper run 20 for carrying boxes of work from the dispatch station to a position opposite any of the work stations, and a lower run 22 for returning boxes of work toward the dispatch station to a diverting mechanism 24 and into a collecting conveyor 26. The collecting conveyor 26 feeds the boxes to a roller conveyor 28 disposed adjacent to a storage rack 30, which has a plurality of compartments adapted to receive the boxes from the rear side, and to permit removal by the dispatcher from the front side for placing onto the head end of the conveyor.

Figure 3:
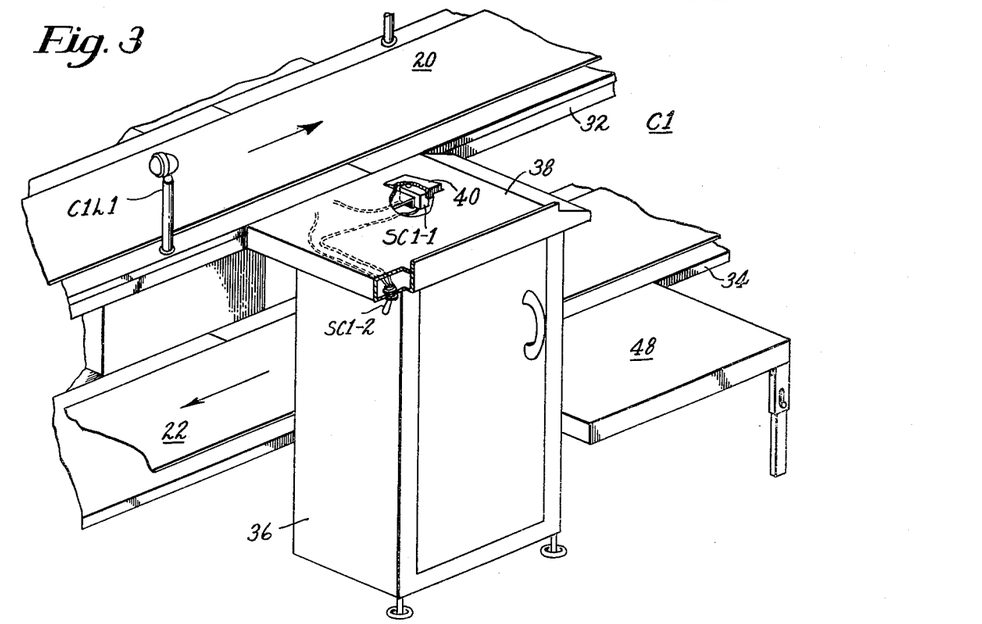
FIG. 3 is a perspective view of a work station of the conveyor of FIG. 1.

The supporting structure for the belt is preferably formed in modules having a length equal to the desired distance between work stations and comprises upper and lower belt supporting members 32 and 34 which are supported at the ends by suitable brackets disposed on cabinets 36 disposed alongside the support members. The upper surface 38 of each cabinet is disposed at substantially the same height as the upper belt support 32 and serves as a reserve box storage platform. Mounted in said surface 38 is a spring-loaded lever 40 which normally projects a small distance above said surface and is adapted to be depressed by the weight of a box of work resting on said surface. The lever 40 at each station operates a first switch (SA1–1, SA2–1, SB1–1, SB2–1, etc.) which is normally closed, but held open when a box of work is present on surface 38. A second manually operated switch (SA1–2, SA2–2, SB1–2, SB2–2 etc.) is provided on each cabinet in series with the first switch so that the circuit of said first switch may be maintained open when the work station is unoccupied.

Also disposed at each work station is a work table 42 which extends generally at a right angle to the belt, with a work machine 44 such as a sewing machine or the like mounted on the table in spaced relation to the belt, to leave a work surface 46 between the machine and the belt to receive a box of work. A signal light (A1L1, A2L1, B1L1, B2L1, etc.) is mounted on the table at each work station in view of the operator with said light being adapted to be lit when a box of work has been dispatched to the station. A return box platform 48 is disposed between the cabinet 36 and the work table 42 at the same height as the lower level 22 of the belt.

Figure 8:
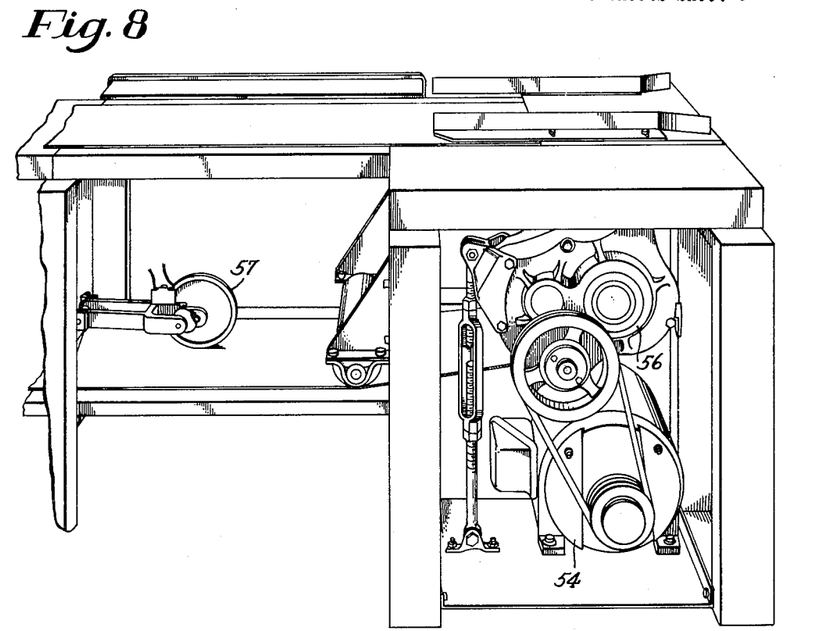
FIG. 8 is a perspective view of the conveyor driving mechanism.

The belt 18 is driven over pulleys (not shown) by a main drive motor 54 through a suitable speed reduction mechanism 56, with the drive motor being energized intermittently through control means by a dispatcher at the dispatch station in a manner to appear hereinafter.

Figure 9:
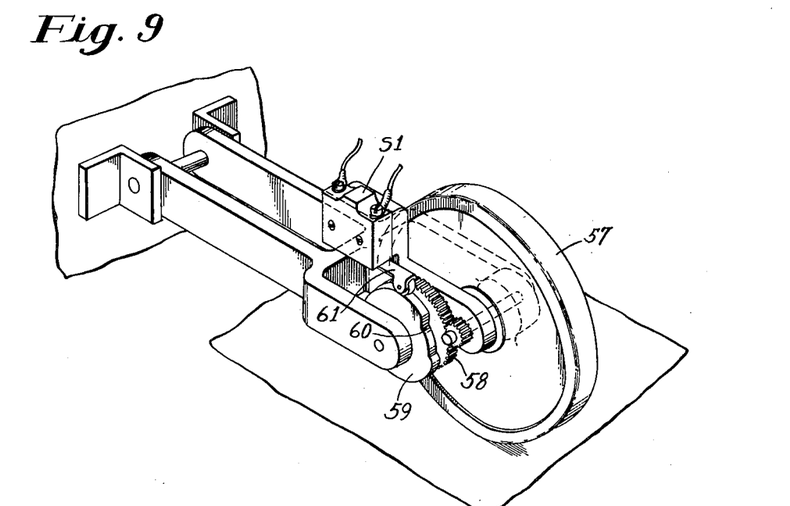
FIG. 9 is an enlarged perspective view of a mechanism for measuring the belt travel.

To determine the distance traveled by the belt and thereby to provide means for stopping the belt after it has traveled a desired predetermined distance, a roller 57 rests on the lower run of the belt, said roller driving, through suitable gearing 58, a cam 59 having a detent 60 adapted to actuate an arm 61 to close switch S1 once each revolution. The diameter of the roller 57 and the ratio of the gearing 58 is such that the switch S1 is closed momentarily once each time the belt has traveled a distance equal to the distance between work stations, which in the illustrated embodiment is approximately 48″.

Figure 4:
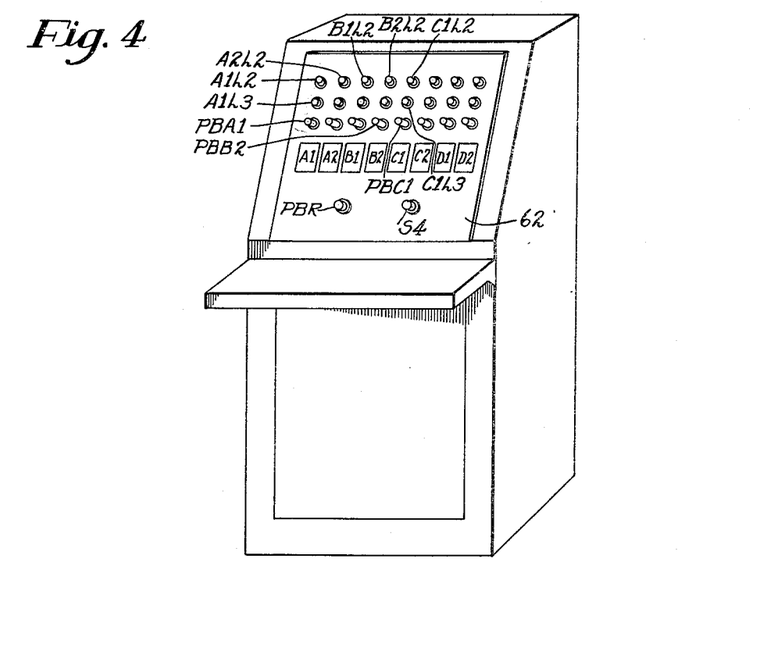
FIG. 4 is a front plan view of the control panel of the conveyor of FIG. 1.

The operation of the conveyor is controlled by the dispatcher by means of a control panel 62 at the head of the conveyor. The panel 62 is provided with indicating and control means corresponding to each work station, comprising, for each work station, a red signal light (A1L2, A2L2, B1L2, B2L2, etc.) a green signal light (A1L3, A2L3, B1L3, B2L3, etc.) and a push button (PBA1, PBA2, PBB1, PBB2, etc.). Each push button actuates two switches corresponding to a work station, one switch being normally closed. For example, PBC1 push button corresponding to station C1, when depressed opens switch SC1–3 and closes switch SC1–4.

The above described normally open switches actuated by the push buttons control the position at which the belt stops, in a manner to be described hereinafter. Since the work stations are disposed in pairs in opposite sides of the conveyor, with the reserve box storage platforms of each pair being disposed at the same distance from the head of the conveyor, a box dispatched for station C1 for example, should be stopped at the same position as a box dispatched for station C2. Hence the normally open switches corresponding to opposite work stations are connected in series. An additional push button PBR is provided on the panel for a purpose to appear hereinafter.

Figure 5:
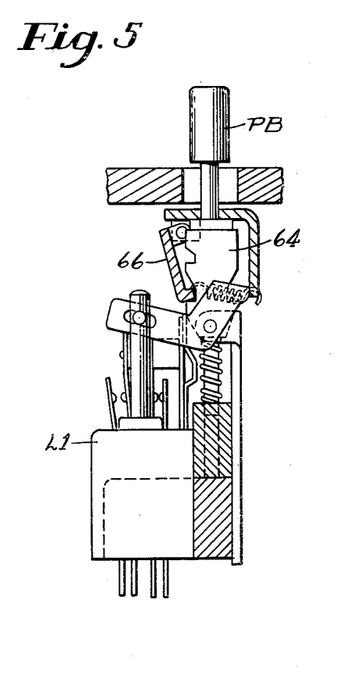
FIG. 5 is a view in section, partly in elevation, illustrating a push button and switch assembly on the control panel of FIG. 3.
Figure 6:
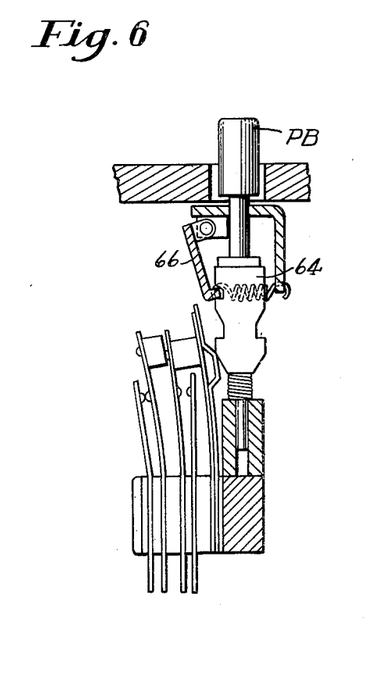
FIG. 6 is a view similar to FIG. 4 with the push button in the depressed condition.

The push buttons on the control panel corresponding to the work stations are adapted to latch in the in position when depressed, by engagement of a push button arm 64 with a latch bar 66. The latch bar 66 is common to all push buttons, and a solenoid L1 is provided to effect movement of the latch bar to release any depressed push button on energization of the solenoid, during a certain portion of the operating cycle, as will appear hereinafter.

Figure 7:
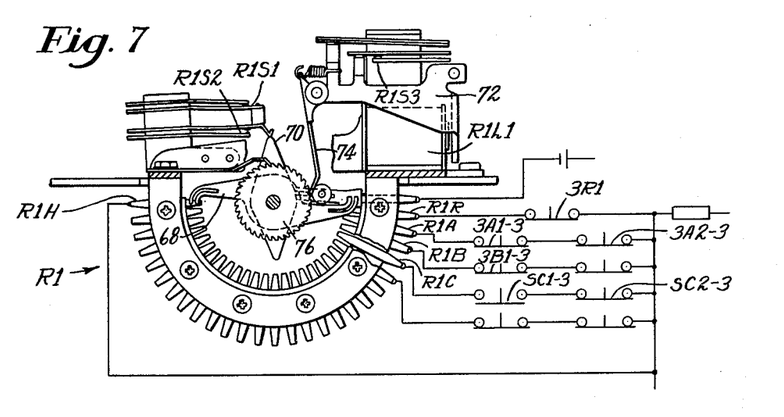
FIG. 7 is a view in side elevation of a stepping relay utilized in the control circuit of the conveyor, with a portion of the circuit connected thereto being shown schematically.

The control circuitry includes a stepping relay switch R1 which comprises a rotatable contact arm 68 adapted successively to complete a circuit to contacts R1H, R1R, R1A, R1B, R1C etc. In the normal or rest position of the relay the contact arm 68 is disposed on contact R1H which may be considered the home position of the relay. Contact R1R is connected to a conveyor reset circuit, and the remaining contacts are connected through the previously disclosed pairs of panel switches corresponding to the various work stations to conveyor control circuits to be described hereinafter. The relay R1 is also provided with a cam 70 for operating switch R1S1 which is normally closed and arranged to open when the contact arm 68 moves off home position, and switch R1S2 which is normally open and arranged to close when the contact arm 68 moves off the home position.

To actuate the control arm the relay R1 is provided with an impulse coil R1L1 which on energization is adapted to move the end of lever 72 upwardly to move ratchet arm 74 into a position such that when the impulse coil R1L1 is deenergized the ratchet arm 74 moves downwardly so that the end thereof rotates ratchet wheel 76 to cause the contact arm 68 to advance one step to the next contact. The movement of lever 72 on energization of the coil R1L1 also opens a normally closed interrupter switch R1S3 which is returned to the closed position when the coil R1L1 is deenergized.

During normal operation of the system an operator at a work station for example, station C1 will have a box of work on the work table 42 and a reserve box of work on the reserve box storage platform 38 so that the switch SC1–1 is held open. When the operator finishes with the work in the boxes on the work table she places it on the return box platform and pushes it onto the lower run of the belt. Thereafter she transfers the reverse box from the reserve box storage platform 38 to the work table. Removal of the box from the platform 38 allows the lever 40 to close the switch SC1–1, thereby energizing red light C1L2 on the control panel and completing a circuit from one side of power source up to the switch SC1–4, which is normally open. When the dispatcher observes the red light on the panel indicating that station C1 needs work, she removes a box of work from the storage rack, places it on the head end of the conveyor, and presses PBC1, the panel push button switch corresponding to station C1.

Figure 10:
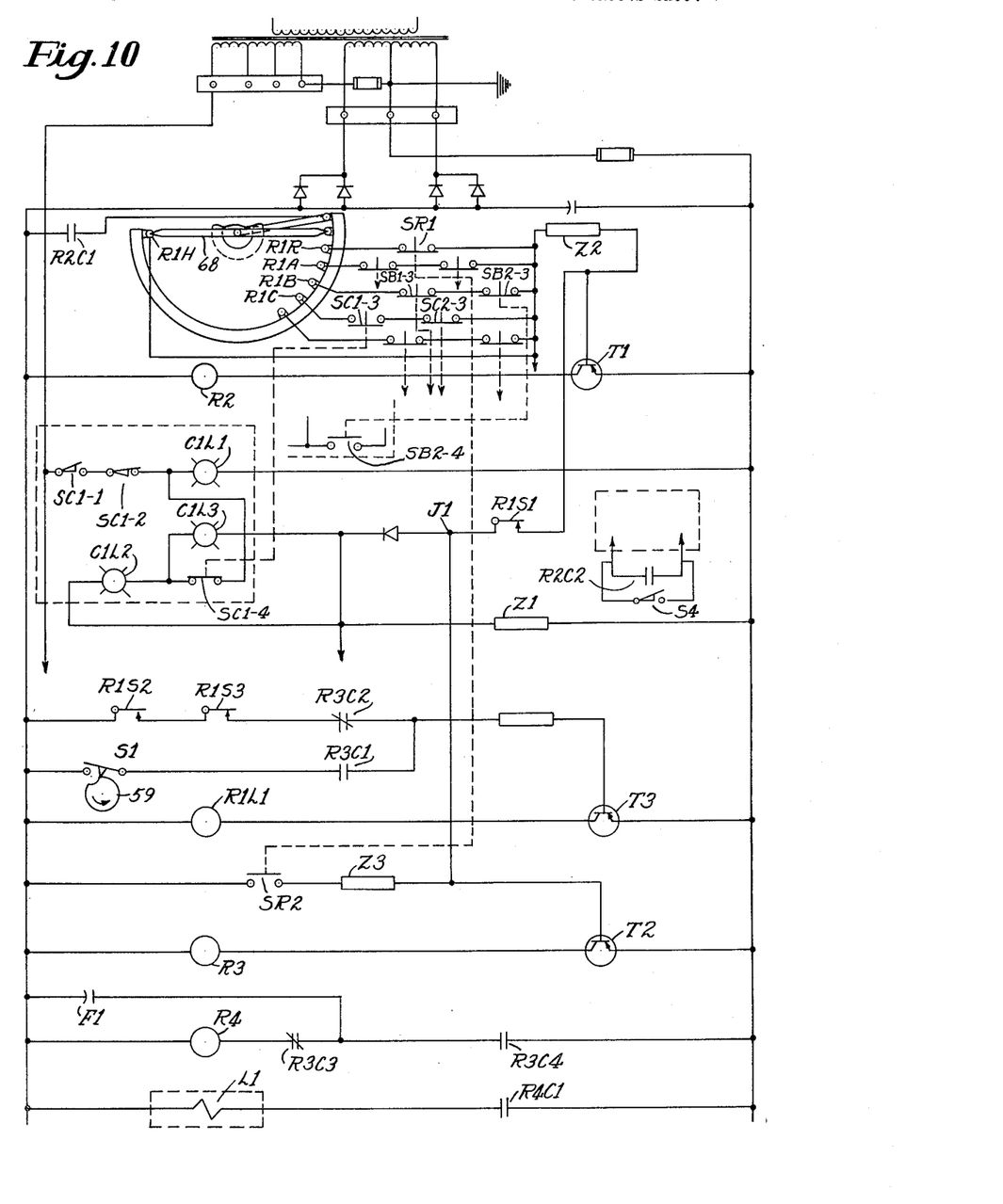
FIG. 10 is a schematic diagram of the control circuit of the conveyor.

When PBC1 is depressed, and latched in the depressed position, it:

(1) opens switch SC1–3, which has no immediate effect, but breaks a circuit to contact R1C of the stepping relay, so that when the contact arm 68 of the relay later reaches R1C, the absence of a complete circuit will stop the conveyor as will appear hereinafter;
(2) closes switch SC1–4, completing a circuit through switches SC1–1 and SC1–2 at the work station C1 to the red light C1L1 at the work station, thereby indicating to the operator at said station that a box of work has been dispatched to her station, and also completes a circuit through the green light C1L3 on the control panel to junction J1 and thence
   (a) to the opposite side of the power line through resistor Z1
   (b) to the base of transistor T1 through normally closed home contacts R1S1 on relay R1 and resistor Z2
   (c) to the base of transistor T2.

The voltage drop across resistor Z1 is utilized in the above-described parallel circuits to the bases of transistors T1 and T2 to actuate said transistors (in the illustrated embodiment by causing the bases to go negative) to permit current to flow in the emitter-collector circuits thereof. In the case of transistor T1, the current flow in the emitter-collector circuit energizes relay R2 which:

(1) closes contacts R2C1, completing a holding circuit, through the contact arm 68 of the stepping switch to the base of transistor T1, and (2) closes contacts R2C2 energizing the main drive motor of the conveyor.

The current flow through the emitter-collector circuit of transistor T2 actuates relay R3 which:

(1) opens normally closed contacts R3C3 and closes normally open contacts R3C4 in the circuit to relay R4, which completes a circuit to capacitor F1 to charge said capacitor, (to enable said capacitor to later actuate relay R4 when relay R3 is subsequently deenergized) and
(2) opens normally closed contacts R3C2 in a circuit, through normally open home contacts R1S2 and interrupter contacts R1S3 to the base of transistor T3 (to prepare the circuit for later returning the stepping relay to the home position), and,
(3) closes normally open contacts R3C1 in a circuit, through the belt cam switch S1, to the base of transistor T3. The belt cam switch S1 is open at this time, hence transistor T3 is not actuated until the belt cam switch closes, as will be described hereinafter.

The energization of the main drive motor by relay R2 starts the belt moving to carry the box of work toward the work station. In normal operation, when the belt starts, the switch S1 is open, with the cam positioned just past the part at which the switch S1 is in the closed position. Hence after the belt has traveled just under 48 inches, the switch S1 closes momentarily, which completes a circuit (through now closed contacts R3C1) to the base of transistor T3 thereby permitting said base to go negative and permit current flow in the emitter-collector circuit thereof, energizing the stepping switch impulse coil R1L1. As previously described, the energization of the coil causes the ratchet arm of the stepping switch to move upwardly. As the belt continues to move, the switch S1 again opens, breaking the circuit to the base of the transistor T3, and thereby deenergizing the coil R1L1 and causing ratchet arm to return to its original position, thereby indexing the contact arm from the home contact R1H to the next contact R1R. When the contact arm leaves the home position, cam 70 opens contact R1S1 breaking the first circuit (through junction J1) to the base of transistor T1, so that the transistor T1 and relay R1 and the conveyor motor remain energized only through the stepping switch contact arm 68. It may be noted at this time that the stepping switch contact arm is of the make before break type, so that the latching circuit to the base of transistor T1 through the stepping switch contact arm is maintained while the arm is moving from one contact to the next.

As the conveyor belt continues to move, the cam switch S1 closes and opens again each time the belt has traveled another 48 inches, with the above-described sequence repeating itself, so that the contact arm indexes forwardly to contact R1A, then to contact R1B, and finally to contact R1C.

Since the push button PBC1 was latched in the in position at the start of the operating cycle, switch SC1–3, connected between contact R1C and the base of transistor T1, remained open, hence when the contact arm 68 reaches contact R1C, the circuit to the base of transistor T1 is broken. The transistor T1 is thereby deactivated, hence relay R2 is deenergized, stopping the belt motor, with the box of work at station C1.

Although the conveyor stops when the contact arm 68 reaches the contact corresponding to the work station to which the box has been dispatched, the transistor T2 remains energized through the reserve box platform switch SC1–1, thereby holding the contacts associated with relay R3 in the condition previously described, so that the relay R1 cannot return to the home position, and the push button PBC1 remains depressed.

Hence, until the operator has removed the box and placed it on the reserve box platform, the conveyor is immobilized, so that the dispatcher cannot send another box of work to another work station. Hence, the dispatcher cannot inadvertently cause the box to move away from station C1 before the operator has had a chance to remove it. In the event that the operator has left the work station, the dispatcher is provided with other means to be described hereinafter for energizing the conveyor motor to cause the belt to carry the box to the end of the conveyor onto the take-off conveyor.

When the operator at station C1 removes the box and places it on the reserve box platform, switch SC1–1 is again opened, which extinguishes the red light C1L1 at the work station, the red light C1L2 and green light C1L3 in the control panel, and breaks the circuit to the base of transistor T2, thereby deenergizing relay R3. When relay R3 is deenergized:

(a) contact R3C4 opens and contact R3C3 closes, which permits the charge stored in condenser F1 to discharge through relay R4, thereby closing momentarily contacts R4C1 to energize momentarily latch bar solenoid L1 to release the push button PBC1 (and any other push buttons that may have inadvertently been depressed in the meantime)
(b) contact R3C1 opens, breaking the circuit to the belt cam switch S1
(c) contact R3C2 closes completing a circuit to the base of transistor D3 which energizes the stepping relay coil R1L1.

As soon as coil R1L1 is energized, the lever 72 opens interrupter contacts R1S3, which deenergizes the transistor T3 and the coil R1L1 advancing the contact arm 68. The resultant closing of the interrupter contacts R1S3 again energizes the transistor T3 and the coil R1L1, so that the indexing cycle repeats itself automatically until the contact arm again arrives at the home position at which time the cam 70 opens home contact R1S2, breaking the circuit between the interrupter contacts and transistor T3, stopping the indexing action. At this time cam 70 also closes home contacts R1S1 to prepare the circuit for the next operation.

It will be understood that in the circuit diagram of FIG. 10 certain switches and lights corresponding to work stations other than C1 have been omitted for clarity.

Switches SC1–1, SC1–2, SC1–4 and lights C1L1, C1L2 and C1L3 corresponding to station C1 as described above shown in FIG. 10 as enclosed within a dotted line. A similar set of switches and lights similarly connected is provided for each of the other work stations, with the switches thereof corresponding to SC1–4 being operable simultaneously with the corresponding push button switch on the appropriate stepping relay contact. For example, switch SB2–4 operates simultaneously with switch SB2–3 on stepping relay contact R1B.

In the event that a box arrives at a station where there is no operator to remove it the dispatcher may close a separate switch S4 which energizes the conveyor motor directly, and hold it closed long enough for the box to be transferred to the take-off conveyor. When the dispatcher stops the conveyor motor after such an operation, the cam 59 operating the switch S1 may stop with the detent 60 in any position, and hence the next box of work to be dispatched would stop in a position which is out of register with the work stations. To realign the detent 60 to the proper orientation, the dispatcher may depress switch PBR, which opens switch SR1 on stepping relay contact R1R, and closes switch SR2.

Switch SR2 completes an independent circuit to the base of transistors T1 and T2, which actuates said transistors to start the conveyor motor and set the circuit contacts in the manner previously described. Hence when the opening and closing of cam switch S1 causes the stepping relay contact arm to index from the home contact to the next contact R1R, the conveyor motor stops with the cam 59 in the proper orientation in relation to the switch S1. As previously described, the push button PBR does not latch in the in position, hence during the above described operation, the dispatcher must maintain the push button PBR depressed manually, until the conveyor stops. When PBR is thereafter released, opening switch SR2, transistor T2 and relay R3 are deenergized, permitting the stepping switch to index to the home position and the circuit to return to the original condition in the manner previously described.

The above described circuit has a number of features which facilitate the operation of the conveyor. As previously described the conveyor is immobilized after a box of work has been sent to a work station, so that the conveyor cannot accidentally be started until the operator at that work station has removed the box and placed it on the reserve box platform. However, the dispatcher can intentionally reactivate the conveyor to move the box away from the work station if desired, and after having done so, can bring the conveyor stop mechanism back into the proper orientation. Another desirable feature of the above described control means is the fact that the dispatcher cannot send a box of work to a station that has not called for it. For example, if station C1 has signalled for work, and the dispatcher accidentally presses push button PBB2 corresponding to station B2, the conveyor is not actuated, since although such action causes switch SB2–4 to close, the switch SB2–1 is open, hence no circuit is created to transistor T1. Since the conveyor does not start the dispatcher immediately knows that an error has been made. Such error can be easily corrected by depressing the push button for the proper work station, which both starts the conveyor and allows the erroneously pressed push button to be released.

Another advantage of the above described control means is the fact that although several stations may need work at the same time, the dispatcher can nevertheless, select which station is to receive work, since the station at which the conveyor is to stop is determined by which contact R1A, R1B, R1C, etc. has an open circuit, and not by the first station down the conveyor that has a closed reserve box platform switch. This feature is particularly advantageous in operations where there is considerable variations in the time required to perform the different operations at the different work stations.

Although in the illustrated embodiment four pairs of work stations are provided, it will be understood that conveyors embodying the features of the invention may be provided with any desired number of work stations, with a corresponding number of stepping relay contacts and push button switches.

Since certain obvious modifications may be made in the herein illustrated specific embodiment of the device, it is intended that all matter contained herein be interpreted in an illustrative and not in a limiting sense.

Having thus described our invention what we claim as new and desire to secure by Letters Patent of the United States is:

1. A conveyor system comprising endless belt means, a series of work stations disposed alongside the belt, a dispatch station at the head of the belt, and control means comprising a stepping relay having a contact arm indexable successively from a home position to a series of contacts corresponding to the various work stations, switch means at each work station and at the dispatch station disposed in series for energizing a conveyor starting circuit, means responsive to the completion of said starting circuit for completing a conveyor running circuit through the stepping relay, means responsive to the movement of said conveyor for causing said stepping switch contact arm to index to the successive contacts, means for breaking the starting circuit after the running circuit is energized, means responsive to the arrival of said contact arm at the contact corresponding to the work station from which the conveyor was energized to break the running circuit to the conveyor.

2. A conveyor system as set forth in claim 1 in which means is provided responsive to the opening of the switch means at the work station for causing the stepping relay contact arm to return to the home position.

3. In a conveyor system, comprising endless belt means, a series of work stations disposed alongside the belt and a dispatch station at the head of the belt control means comprising a stepping relay having a contact arm indexable from a home position successively to a series of contacts corresponding to the various work stations, normally closed switch means in series with each of said contacts to a conveyor energizing means, first switch means at each work station and second switch means at the dispatch station in series therewith for completing a first circuit to said conveyor energizing means, means responsive to the closing of one of said second switches corresponding to a particular work station for opening the normally closed switch on the stepping relay contact corresponding to said work station, means responsive to the completion of the first circuit to the conveyor energizing means for completing a second circuit to the conveyor energizing means through the stepping relay contact arm, means causing the stepping relay contact arm to index forwardly to the next contact for each increment of belt travel equal to the distance between work stations, means for breaking said first circuit to the conveyor energizing means after the circuit thereto through the contact arm is established, whereby when said contact arm reaches the contact corresponding to said particular work station, the second circuit to the conveyor energizing means is broken.

4. A conveyor system as set forth in claim 3 in which means is provided rendering the conveyor energizing means inoperative after the conveyor has stopped until said first switch means at the work station has been opened.

5. In a conveyor system having endless belt means, a series of work stations disposed alongside the belt, at predetermined intervals and a dispatch station at the head of the belt, control means comprising a stepping relay having a contact arm indexable successively to a series of contacts corresponding to the various work stations, conveyor energizing means connected to each contact, switch means controllable from each work station and switch means in series therewith controllable from the dispatch station for causing a circuit to be completed through the stepping relay to the conveyor energizing means, means responsive to the actuator of said switch means corresponding to a particular work station for rendering inoperative the circuit to the conveyor energizing means from the stepping relay contact corresponding to that station, means causing the contact arm of the stepping relay to advance to the next contact for each increment of belt travel equal to the distance between work stations, whereby when said contact arm arrives at the contact corresponding to said particular work station the circuit to the conveyor energizing means is broken to stop the conveyor.

6. A conveyor system having endless belt means, a series of uniformly spaced work stations disposed along the belt and a dispatch station at the head of the belt, control means, comprising an operator's switch at each work station, each of said operator switches being adapted to complete a signal circuit to the dispatch station and also an energizing circuit to a conveyor actuating switch at the dispatch station corresponding to that work station, said conveyor actuating switch being adapted when operated to complete a first conveyor energizing circuit and a second conveyor energizing circuit, said second circuit being through the contact arm of a stepping relay, said contact arm being indexable from a home position successively to a series of contacts, corresponding to each work station, means on each of said contacts for continuing said second conveyor energizing circuit through circuit interrupting means, means responsive to the movement of the contact arm away from the home position for breaking said first conveyor energizing circuit, means responsive to movement of the belt for causing said contact arm to index forwardly to the next contact once for each increment of belt travel equal to the distance between work stations, means responsive to the operation of said conveyor actuating switch corresponding to a particular work station to actuate the circuit interrupting means on the stepping relay contact corresponding to said particular work station, whereby when said contact arm reaches said contact, the second conveyor energizing circuit is broken.

7. A conveyor system having endless belt means, a series of uniformly spaced work stations disposed along the belt, and a dispatch station at the head of the belt, control means comprising a reserve article platform at each work station, first switch means associated with each platform, said first switch being responsive to the presence or absence of an article on the reserve platform to deenergize or energize, respectively, a second switch at the dispatch station to enable said second switch, when energized, to be actuated to complete a first conveyor energizing circuit and a second conveyor energizing circuit, said second conveyor energizing circuit being through the contact arm of a stepping relay, said stepping relay having a home contact and a series of other contacts corresponding to the work stations to which the contact arm is indexable in succession, means for completing the second conveyor energizing circuit from each of said other contacts through circuit interrupting means, means measuring the distance travelled by the belt and for causing said contact arm to index forwardly to the next contact each time the belt has travelled a distance equal to the distance between work stations, means responsive to the indexing of said contact arm away from the home position for breaking the first conveyor energizing circuit whereby the conveyor is maintained energized only through the stepping relay, means responsive to the actuation of said second switch corresponding to a particular work station to actuate the circuit interrupting means on the stepping relay contact corresponding to said station, whereby when said contact arm is indexed to said contact, the second conveyor energizing circuit is broken, stopping the conveyor.

8. A conveyor system as set forth in claim 7 in which the subsequent actuation of said first switch means by the placing of an article on the reserve article platform causes said second switch, the circuit interruptor means, and the stepping relay to return to their original condition.

References Cited in the file of this patent

UNITED STATES PATENTS

| | | |
|---|---|---|
| 1,872,000 | Keller | Aug. 16, 1932 |
| 2,362,079 | McCann | Nov. 7, 1944 |
| 2,608,284 | Fahey | Aug. 26, 1952 |
| 2,778,504 | Byrne | Jan. 22, 1957 |